United States Patent [19]

Ryan et al.

[11] 4,414,645

[45] Nov. 8, 1983

[54] HARDWARE-FIRMWARE CRT DISPLAY LINK SYSTEM

[75] Inventors: Joseph L. Ryan, Nashua, N.H.; Gerald N. Winfrey, Billerica, Mass.

[73] Assignee: Honeywell Information Systems Inc., Waltham, Mass.

[21] Appl. No.: 296,932

[22] Filed: Aug. 27, 1981

Related U.S. Application Data

[63] Continuation of Ser. No. 34,832, Apr. 30, 1979, abandoned.

[51] Int. Cl.[3] .............................................. G06F 3/153

[52] U.S. Cl. ..................................... 364/900; 340/750

[58] Field of Search ............... 340/709, 798, 792, 801, 340/750; 364/200, 900

[56] References Cited

U.S. PATENT DOCUMENTS

| | | | |
|---|---|---|---|
| 3,582,946 | 6/1971 | Mita et al. | 340/792 X |
| 3,654,609 | 4/1972 | Bleuthman et al. | 364/200 |
| 3,675,208 | 7/1972 | Bard | 364/900 |
| 3,848,232 | 11/1974 | Leibler et al. | 364/200 |
| 3,974,493 | 8/1976 | de Cavaignac | 340/709 |
| 4,249,172 | 2/1981 | Watkins et al. | 340/750 X |

*Primary Examiner*—Harvey E. Springborn
*Attorney, Agent, or Firm*—George Grayson; Nicholas Prasinos

[57] ABSTRACT

Each row of video information in a display memory includes a linking character code followed by address codes representative of the address location in such display memory of a first data character of a next row of video information displayed on the CRT screen. Both row insertions and deletions may be accommodated by changing address codes under firmware control without requiring the complete rewrite of video information stored in the display memory.

4 Claims, 9 Drawing Figures

HARDWARE-FIRMWARE CRT DISPLAY LINK SYSTEM

This application is a continuation, of application Ser. No. 034,832, filed Apr. 30, 1979, now abandoned.

BACKGROUND OF THE INVENTION

1. Field of the Invention

The invention relates to video display systems, and more particularly to a memory allocation control system for selectively accessing rows of video information stored in a video display system memory unit in any order without requiring a reconstruction of the video information as originally stored in the memory unit.

2. Description of the Prior Art

Video display systems have generally stored rows of video information in display memories in a predetermined order. Each row of video information has been of a fixed length, and has been read from the memory unit sequentially in the order stored. In order to insert or delete rows of video information, a reconstruction of the video information within the memory has been required.

Typical of such prior art systems are those disclosed in U.S. Pat. No. 3,500,335 entitled "Random Access—Data Editing Communication Network"; and U.S. Pat. No. 4,068,225 entitled "Apparatus for Displaying how Information on a Cathode Ray Tube Display and Rolling Over Previously Displayed Lines", both assigned to the same assignee as the instant application.

U.S. Pat. No. 3,500,335 describes the digitally added data stored in a main memory which is organized in a manner such that it is suitably available for generation of a cyclic presentation on a television raster display.

U.S. Pat. No. 4,068,225 describes the continual adjustment of the addressing used to access locations within the internal memory by maintaining a count of the number of rows of information that have already been entered and adding the count to the row portion of each address used in accessing locations within memory.

SUMMARY OF THE INVENTION

A video terminal display system includes a timing and control system for generating data bus and address bus timing cycles, a memory system for storing microprograms and video information, a central processor unit (CPU) for controlling overall system operation through access to the microprogrammed subroutines and a cathode ray tube (CRT) control system for displaying rows of video information. The memory, CPU and CRT control systems are all coupled in common to the address bus and data bus. The address and data busses are operative with the CPU and memory during CPU time and operative with the CRT control system and memory during DMA time. The video display system displays rows of video information of variable length on the CRT. This video information stored may be deleted, added, or reordered in any manner without requiring the reconstruction of the video information in the memory.

More particularly, a linking byte and address bytes are added to the trailing end of each row of video information stored in the memory unit. As video information is read from the memory unit, hardware logic detects the linking byte and the address bytes for indicating a memory address of a next row of video information to be read from the memory unit.

In one aspect of the invention, video information rows of variable length may be stored in the display memory unit for display on a CRT screen.

In another aspect of the invention, video information rows stored in the memory unit may be read from the memory unit and displayed on a CRT screen in any order by merely changing the address bytes associated with the information rows.

In a still further aspect of the invention, a row of video information may be inserted or deleted or reordered in the memory unit by modifying the address bytes at the trailing end of no more than three video information rows.

DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENT

FIG. 1

Figure 1:
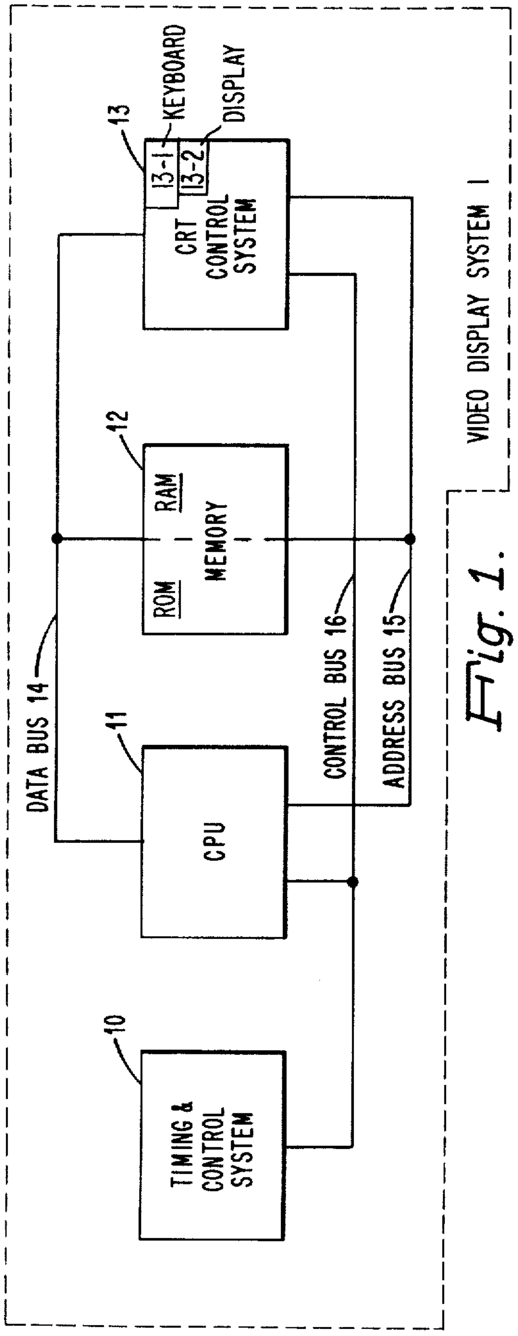
FIG. 1 is a functional block diagram of a video display system incorporating the invention.

FIG. 1 illustrates in functional block diagram form a video terminal display system 1 comprising a timing and control system 10, a central processing unit (CPU) 11, a memory unit 12 and a cathode ray tube (CRT) control system 13. Communication between the devices comprising the video terminal display system 1 is accomplished by way of a bidirectional data bus 14 for receiving or sending data signals over the same data signal lines, an address bus 15 for sending address signals to memory 12 and a control bus 16 for transferring control signals between the devices.

The invention disclosed herein is embodied in the CRT control system 13.

The timing and control system 10 generates the system bus timing cycles for the data bus 14, address bus 15 and the control bus 16. The system bus timing is divided into address bus timing cycles and data bus timing cycles which are offset from each other. The address bus and data bus timing cycles are further divided into alternate CPU cycles and direct memory access (DMA)

cycles. The DMA cycles are used by peripheral subsystems to communicate with memory unit 12. The CPU 11 is operative during CPU cycles, while the CRT control system 13 is operative during specific DMA cycles.

The memory unit 12 is comprised of a random access memory (RAM) and a read only memory (ROM). The CRT control system 13 includes a keyboard 13-1 and a CRT display 13-2 Microprogrammed subroutines are stored in the ROM to control overall system operation. Sections of the ROM, however, are set aside as registers, buffers and word areas to be used during system operation. The memory unit 12 is operative during both CPU and DMA bus cycles. When a memory address is received by the memory unit 12 from the CPU 11 by way of address bus 15 during a memory read cycle, a data word is provided by the memory unit 12 to the data bus 14. During a memory write cycle, a data word is received from the CPU 11 by way of data bus 14, and is written into the memory location addressed by the CPU 11 on the address bus 15.

The CPU 11 thus is operative with both the data bus 14 and the address bus 15 during CPU cycles. During system operation, the CPU 11 may read or write into the RAM of the memory unit 12 to accommodate necessary system bookkeeping. The CPU 11 further controls the overall system operation through access to the microprogrammed subroutine stored in the ROM of the memory unit 12.

The CRT control system 13 is operative during DMA cycles, during which the control system supplies memory address signals to the memory unit 12 by way of the address bus 15. Control information and data characters thereby are addressed for each row of information supplied by the memory unit 12 to the control system 13 by way of data bus 14.

A brief description of control signals generated and received by the timing and control system 10 by way of control bus 16 during system operation are described below:

CPUADR-00

CPU Address Control

This signal defines the timing of the DMA and the CPU cycles of address bus 15. When the signal is low, the CPU address lines are gated to the address bus 15. When the signal is high, the DMA address lines are gated to the address bus 15.

CPUDAT-00

CPU Data Control

This signal defines the timing of the DMA and the CPU cycles of data bus 14. When the signal is low, the CPU 11 is operative with the data bus 14 to transfer data between CPU 11 and memory 12. When the signal is high, the transfer of data over data bus 14 is between two DMA subsystems or between a subsystem and memory 12.

BUSRWC+00

Bus Read Write Control

This signal defines the type of data transfer on the data bus 14. It is valid during the CPUADR time for that phase of the bus cycle.

When the signal is at a logic one level during a CPU cycle, data is read from a device such as memory unit 12 to the CPU 11 over the data bus 14. When the signal is at a logic zero level, the data is written from the CPU 11 to the memory unit 12 over the data bus 14. If the signal is at a logic one level during a DMA cycle, data is read from the memory unit 12 to the CRT control system 13 over the data bus 14. If the signal is at a logic zero level, data is sent to the memory unit 12 over the data bus 14 from the control system 13.

DMAREQ

DMA Request

The DMAREQ+01 DMA request signal is assigned to the CRT control system 13. In the preferred embodiment described herein, there are four DMA cycles: DMA1, DMA2, DMA3 and DMA4. A subsystem requests an assigned DMA bus cycle by forcing its DMAREQ signal to a logic zero level. Subsystems with the exception of memory 12 and CRT control system 13 that are operative during an assigned DMA cycle are not shown since they are not pertinent to the invention.

DMAKXO-

The four DMA signals DMAK10-, DMAK20-, DMAK30- and DMAK40- define respective time slots DMA1, DMA2, DMA3 and DMA4 on the control bus 16 when forced to a logic zero level.

BRESET-00

Bus Reset

This signal is used by the CPU 11 to clear registers and reset flip-flops throughout the video terminal display system. System reset occurs when the signal transitions to a logic zero level.

FIG. 2

Figure 2:
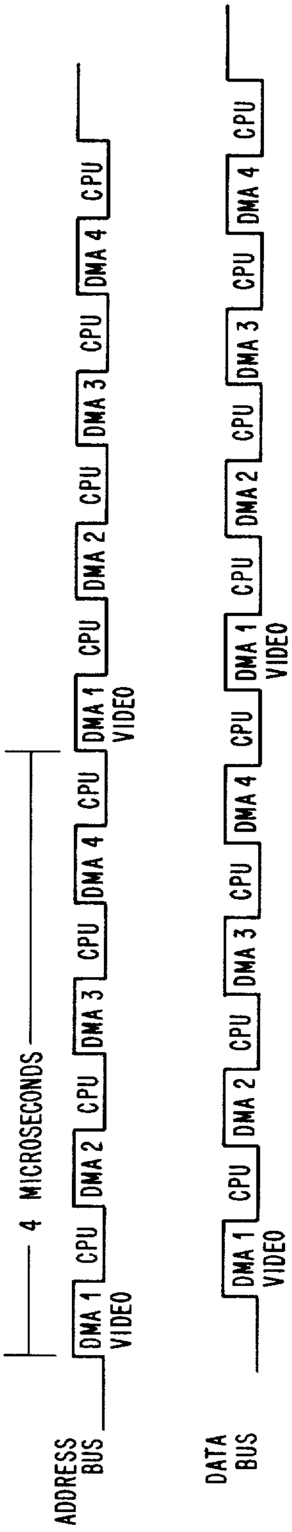
FIG. 2 is a graphic illustration of splitting the address and data bus timing cycles into alternate CPU and DMA cycles of the video display system.

FIG. 2 illustrates in timing graph form the splitting of system bus time periods into alternate CPU cycles and DMA cycles.

Referring to FIG. 2, the address bus and data bus timing cycles of video display system 1 are divided into DMA and CPU cycles. The DMA cycles occur in order as DMA1, DMA2, DMA3, and DMA4 cycles. Each of the DMA cycles are repeated approximately every 4 microseconds in the preferred embodiment as described herein. The CPU 11 is operative during each CPU cycle occurring on the data bus 14 or the address bus 15. The CRT control system 13 of FIG. 1 is exclusively assigned to be operative during DMA1 cycles to provide a CRT video display of CRT control system 13 with continuous refresh information from the memory unit 12.

FIG. 3

Figure 3:
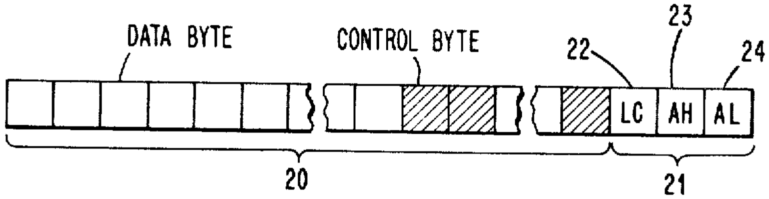
FIG. 3 is a graphic illustration of information formatted in accordance with the invention for display on a CRT screen.

FIG. 3 illustrates in graphic form the format of a row of video information stored in the RAM comprising memory unit 12.

Referring to FIG. 3, a row of video information stored in memory 12 may be comprised of a variable number of data bytes and a variable number of visual attribute bytes in a video information field 20 of variable length. The visual attribute bytes are control bytes, each of which may command the CRT control system 13 to display either an underline, a blinking, a blank, an inverse video contrast, a low intensity, or an alternate character set in a CRT screen. The video information field is followed by a contiguous link field 21 comprised of a link byte 22, a most significant address byte 23, and a least significant address byte 24.

In the preferred embodiment described herein, the link byte 22 is a hexadecimal F1 code (binary 1111 0001) which indicates to the hardware control system of the invention that the following bytes 23 and 24 provide a 16-bit address pointing to a next row of video information in the RAM of memory unit 12.

FIG. 4

Figure 4:
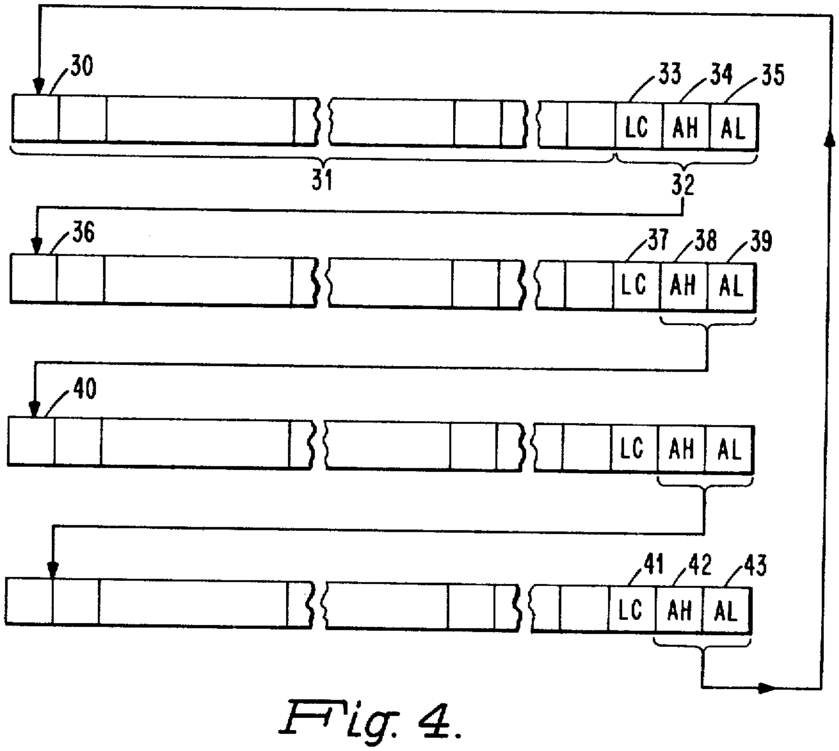
FIG. 4 is a graphic illustration of the linking provided by the hardware-firmware control system of the invention to select rows of video information randomly located within a random access memory.

FIG. 4 illustrates in graphic form the selection of video information rows within the RAM of the memory unit 12.

Referring to FIG. 4, video information rows of variable length are stored sequentially in the RAM. Each video row includes data bytes and may include one or more control bytes followed by the link byte and two address bytes.

In a normal display operation wherein no video information rows are to be inserted or deleted in the memory unit 12, the CPU 11 in response to firmware stored in the ROM of memory unit 12 loads a first address of a location in the RAM of memory unit 12 into address byte counters of the hardware control system of the present invention as shall be further explained. The address shall point to a first data byte 30 in a video information row stored in the RAM. The data bytes in the addressed video information row are scanned left to right through the video information field 31, which is followed by a link field 32. Within the link field, a link byte 33 serves to indicate that a most significant byte (MSB) address byte 34 and at least significant byte address byte 35 shall immediately follow to point to a first data byte 36 in a next row of video information. The horizontal scan of the information row continues as before described until the link byte 37 is detected by the hardware control logic comprising a part of the invention. The control logic senses the address bytes 38 and 39 to address a first byte 40 of a next occurring row of video information. When the link byte 41 of a last row of video information completing a display page of CRT display 13-2 is detected, the address bytes 42 and 43 point to the first byte 30 of the first row of video information in the display page.

FIG. 5

Figure 5:
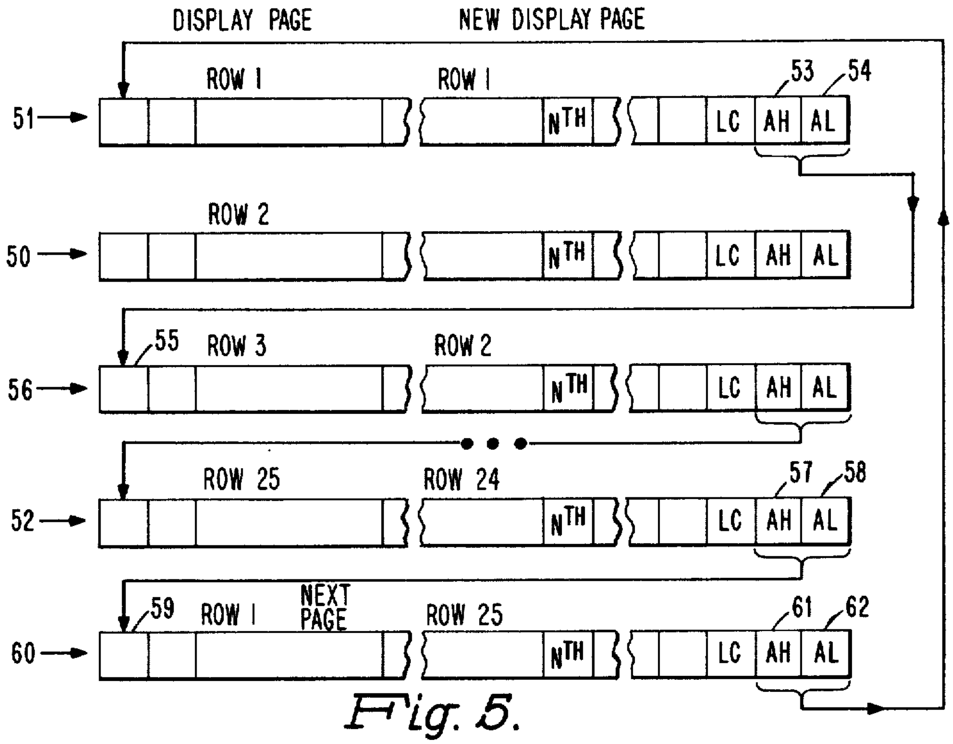
FIGS. 5 and 6 are graphic illustrations of video information row insertion and deletion operations, respectively, in accordance with the invention.

FIG. 5 illustrates in graphic form the operation of the hardware-firmware logic control system of the present invention in deleting a row of video information from a display page. Typically a row may be deleted by placing the CRT cursor on the first character of the row to be deleted and depressing the "delete line" key on keyboard 13-1 of the CRT. Control system 13, under firmware control of the CPU 11, will then modify the required address bytes of the rows of video information stored in memory 12 to result in the selected row being deleted from the display page. The deleted row remains stored in memory 12.

In prior known systems, all display rows following a row of characters to be deleted were shifted upward in the vertical order of the display terminal memory. In the present invention, a row of characters may be deleted from the display page merely by changing the address bytes following the link byte in the row of video information preceding the row to be deleted, and by changing the address codes of the last row of the display page and the address bytes of a first row of a next display page to become a new last row completing a new display page. It thus is necessary to change only six bytes of address codes in the memory unit 12 in order to accommodate a video information row deletion. The video information in the memory unit remains unchanged.

FIG. 5 shows a display page comprising 25 rows of video information. Initially the display page includes row 1 51, row 2 50, rows 3 56, rows 4 through 24, (not shown) and row 25 52. Row 25 60 initially appears as row 1 of the next page when it is displayed. When the CRT cursor is placed at the left end of row 2 50 and the "delete row" key on keyboard 13-1, then the display page includes row 1 51, row 2 56, row 24 52 and row 25 60.

To affect the deletion of row 2 50, it is necessary to change in memory 12 the address bytes 53 and 54 of row 51 to address a first byte 55 of a next row 56 rather than a first byte of row 50. In addition, the address bytes 57 and 58 of the last row 52 of the display page shall have to be changed to refer to the first byte 59 of a last row 60 of a new display page. In addition, the address bytes 61 and 62 of the row 60 would have to be changed to refer to the first byte of the row 51. Thus, any single row within a display page may be deleted by merely changing six address codes within the memory unit 12. The video information in the video information fields of each row remain unchanged in the memory locations in which they were originally stored.

FIG. 6

Figure 6:
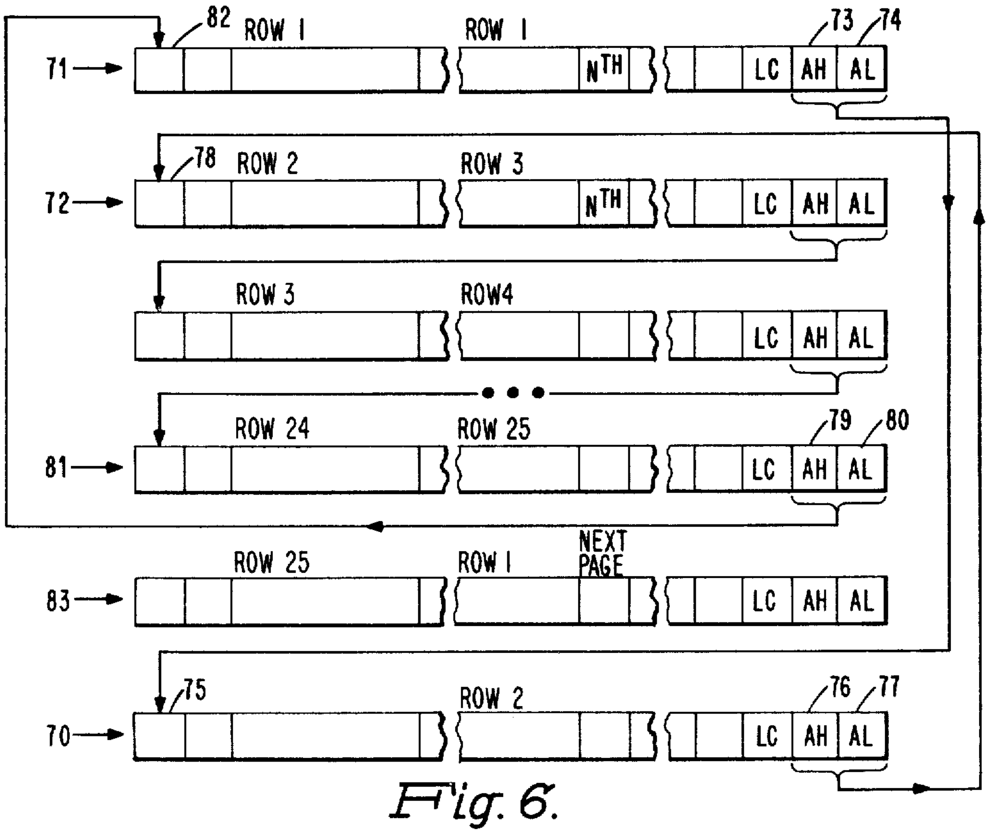

FIG. 6 illustrates graphically the operation of the hardware-firmware control system of the present invention in inserting a new row of video information within a display page stored in the memory unit 12. Typically a row is inserted by placing the CRT cursor at the beginning of the row, depressing the "insert row" key and keying in a row of bytes on keyboard 13-1 of the CRT control system 13. There under firmware control the CPU 11 will modify the required address bytes of the rows of information stored in memory unit 12 to result in the inserted row being displayed on the display page.

FIG. 6 shows the 25-row display page before the addition of a new row of bytes. Row 1 71 is followed by row 2 72, row 3 85, rows 4 through 23 (not shown), row 24 81 and row 25 83. Placing the CRT cursor to the left of row 2 72 and depressing the "insert row" key results in the page displaying row 1 71, row 2 70, row 3 72, row 4 85, rows 5 through 24 (not shown) and row 25 81.

To insert the new row 70, only six address bytes within the memory unit 12 would have to be changed. For example, the address bytes 73 and 74 of row 71 would be changed to refer to a first data byte 75 and the new row 70, and the address bytes 76 and 77 of row 70 would be changed to refer to a first data byte 78 of the second row 72 of the previous display page. The address bytes 79 and 80 of the next to the last row 81 of the previous display page further would be changed to refer to a first data byte 82 of the first row 71 of the new display page. Row 81 thereupon would become the last row of the new display page.

As before stated, a row insertion in prior known systems required that all data occurring after the point of insertion in the memory unit be moved down in memory to provide a space for the new video information row. The information in the last display row of the display page thereupon would be overwritten and lost. In the present invention, the last row of the previous display page referred to as row 83 in FIG. 6 would remain in the memory unit 12, and the information content of that row would be preserved for future use.

FIGS. 7–8

Figure 7:
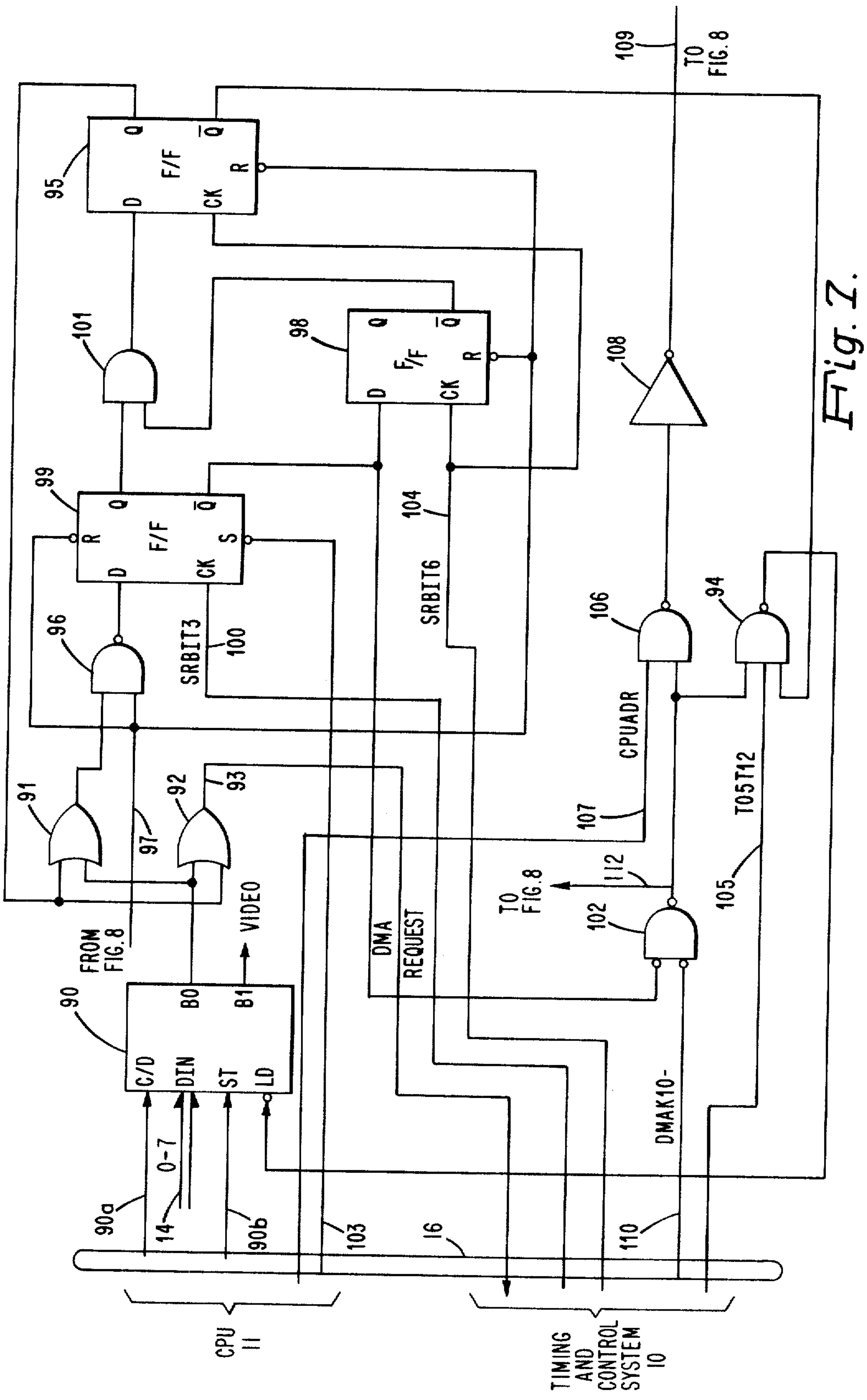
FIGS. 7 and 8 comprise a detailed electrical schematic diagram of the logic control system comprising the invention.
Figure 8:
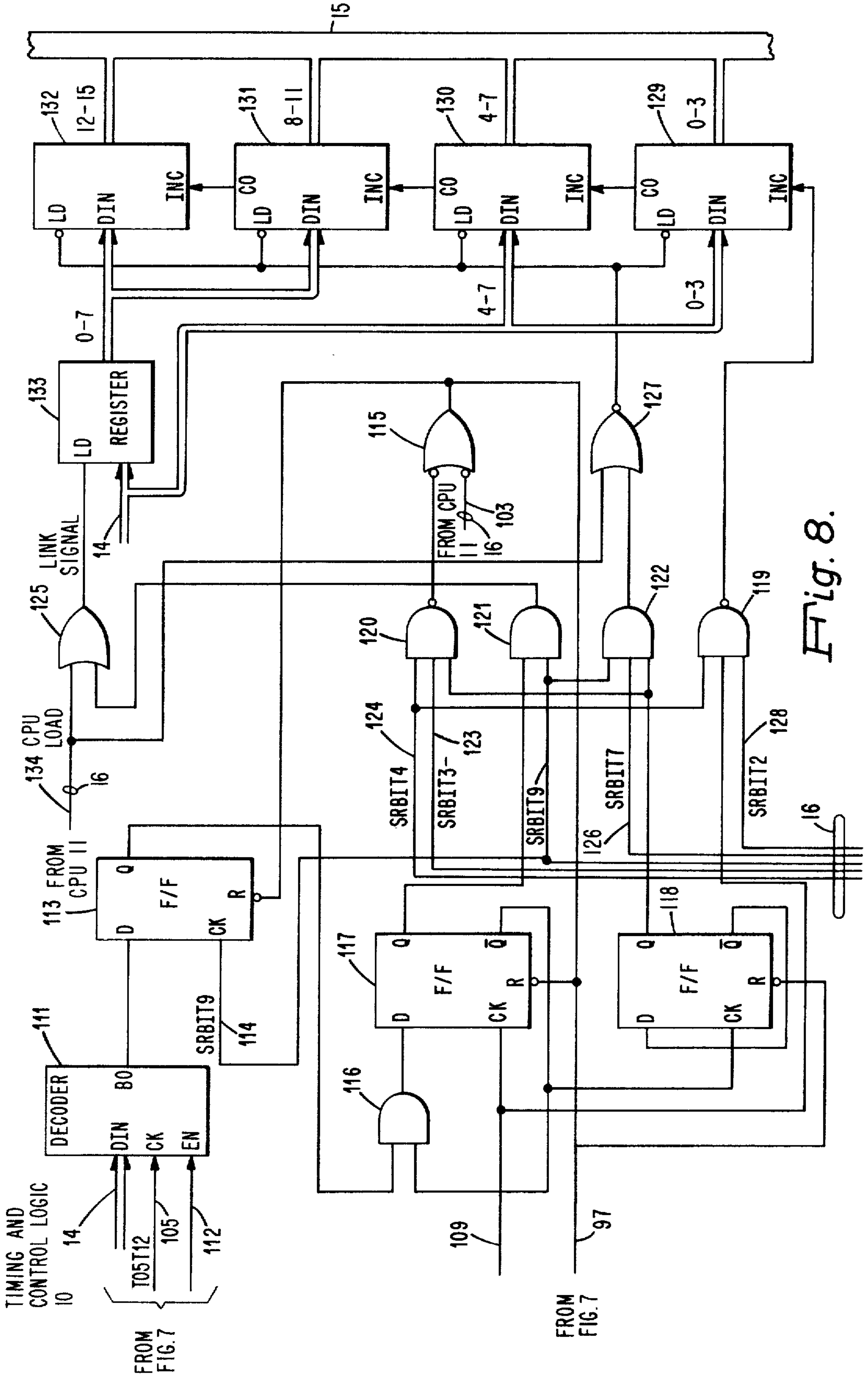

FIGS. 7–8 illustrate in electrical schematic form the logic control system of the present invention.

In referring to the logic diagram illustated in FIGS. 7 and 8, it is to be understood that the occurrence of a small circle at the input of a logic device indicates that the input is enabled by a logic zero. Further, a circle appearing at an output of a logic device indicates that when the logic conditions for that particular device are satisfied, the output will be a logic zero.

Referring to FIG. 7, the system data bus 14 is connected to the data input (DIN) of a programmable CRT control unit 90, the B0 output of which is connected to one input of an OR gate 91. The B0 output further is connected to one input of an OR gate 92, the output of which, the DMA request signal, is applied to a control line 93 leading to the system control bus 16 of FIG. 1. The B1 output of the control unit 90 is comprised of video data which is applied to a visual display control system which is not part of the present invention. The load (LD) input to control unit 90 is connected to the output of a NAND gate 94. The control buffer/data buffer (not shown) input (C/D) of the control unit 90 is connected to CPU 11 via a control line 90*a*, and the start command input (ST) to the control unit is connected to CPU 11 via a control line 90*b* leading from the control bus 16.

The CRT control unit 90 is manufactured and sold by the Intel Corporation, 3065 Bowers Avenue, Santa Clara, Calif. 95051, as an Intel Programmable CRT Controller Type 8275 which is described in the Intel "Component Data Catalog", published 1979.

A second input to OR gate 91 is connected to the Q output of a D-type flip-flop 95, and to a second input of gate 92. The output of OR gate 91 is connected to one input of a NAND gate 96. A second input to NAND gate 96 is connected to a control line 97, and to the reset inputs of flip-flop 95 and a D-type flip-flop 98. The output of NAND gate 96 is applied to the D input of a D-type flip-flop 99.

The clock input to flip-flop 99 is connected to a control line 100 leading from the control bus 16 of FIG. 1. The reset (R) input to the flip-flop 99 is connected to control line 97, and the Q output of the flip-flop is connected to one input of an AND gate 101. The Q output of the flip-flop 99 is connected to the D input of flip-flop 98 and to one input of a negative AND gate 102. The set input of the flip-flop 99 is connected to a control line 103.

The clock input to flip-flop 98 is connected to a control line 104 leading to control bus 16 of FIG. 1, and the Q output of the flip-flop is connected to a second input of AND gate 101. The output of AND gate 101 is connected to the D input of flip-flop 95. The clock input to flip-flop 95 is connected to control line 104, and the Q output of the flip-flop is connected to a first input of a NAND gate 94.

A second input to NAND gate 94 is connected to a control line 105 leading to the system control bus 16 of FIG. 1. A third input to NAND gate 94 is connected to one input of a NAND gate 106 and to the outut of negative AND gate 102. A second input to NAND gate 106 is connected to a control line 107 leading to the system address bus 15 of FIG. 1. The output of NAND gate 106 is applied through an inverter 108 to a control line 109. A second input to negative AND gate 102 is connected to a control line 110.

Referring to FIG. 8, the data bus 14 is applied to the data input of a link byte decoder 111 for detecting a link byte code which in the preferred embodiment is a hexadecimal F1 code. The clock input to the decoder 111 is connected to control line 105 of FIG. 7, and the enable input to the decoder 111 is connected to a control line 112 from the output of negative AND gate 102 of FIG. 7. The B0 output of decoder 111 is applied to the D input of a D-type flip-flop 113.

The clock input to the flip-flop 113 is connected to a control line 114 leading to the system control bus 16 of FIG. 1, and the reset input to the flip-flop is connected to the output of a negative OR gate 115. The Q output of the flip-flop 113 is applied to one input of an AND gate 116, the output of which is applied to the D input of a D-type flip-flop 117. A second input to AND gate 116 is connected to the Q output of the flip-flop 117 and to the clock input of a D-type flip-flop 118.

The clock input to flip-flop 117 is connected to control line 109 of FIG. 7 and to one input of a NAND gate 119. The reset input to flip-flop 117 is connected to the reset input of flip-flop118 and to the output of a negative OR gate 115. The output of negative OR gate 115 further is connected to control line 97 of FIG. 7. The Q output of flip-flop 117 is connected to a first input of an AND gate 121. The Q output of flip-flop 118 is connected to its D-input, and the Q output of the flip-flop is connected to a first input of an AND gate 122 and to a first input of NAND gate 120.

A second input to NAND gate 120 is connected to control line 123 leading from the system control bus 16, and a third input to NAND gate 120 is connected to a control line 124 leading to the system control bus 16 of FIG. 1. A second input to AND gate 121 is connected to control line 114 from system control bus 16 of FIG. 1 and further is connected to a second input of gate 122. The output of AND gate 121 is applied to one input of an OR gate 125. A third input to AND gate 122 is connected to a control line 126 leading to the system control bus 16, and the output of AND gate 122 is applied to one input of a NOR gate 127. A second input to NAND gate 119 is connected to a control line 128 leading to the system control bus 16, and a third input to NAND gate 119 is connected to the control line 124. The output of NAND gate 119 is connected to the increment (INC) input of a four-bit counter 129.

The four-bit output of the counter 129 is applied to bit lines 0–3 of the system address bus 15. The data input to the counter is connected to bit lines 0–3 of the system data bus 14 of FIG. 1, and the data input of a four-bit counter 130 is connected to bit lines 4–7 of data bus 14. The load input to counter 129 is connected to the output of NOR gate 127, to the load input of counter 130, and to the load input of four-bit counters 131 and 132. The carry-out (CO) output of counter 129 is connected to the increment input of counter 130, and the output of counter 130 is applied to the bit lines 4–7 of the system address bus 15. The carry-out output of counter 130 is connected to the INC input of counter 131, and the output of counter 131 is connected to the bit lines 8–11 of the system address bus 15. The data input to the counter 131 is connected to the bit 0–3 outputs of an eight-bit register 133, and the carry-out output of counter 131 is connected to the INC input of the counter 132. The data input to counter 132 is connected to the bit 4–7 outputs of register 133, and the output of counter 132 is connected to the bit 12-15 lines of the address bus 15.

Counters 129, 130, 131 and 132 are 74LS193 circuits described in the "TTL Data Book for Design Engineers", Second Edition, published 1976 by Texas Instruments Incorporated of Dallas, Texas.

The data input to register 133 is connected to the bit lines 0-7 of the system data bus 14 of FIG. 1, and the load input to the register 133 is connected to the output of OR gate 125. A second input to OR gate 125 is connected to a control line 134 and to a second input of gate 127 from the CPU 11 via control bus 16. A second input to negative OR gate 115 is connected to a control line 103 from CPU 11.

Prior to operation, the logic control system of FIGS. 7-8 enters into a power-in initialization cycle. During the initialization cycle, the timing and control system 10 is activated to provide 1.0 MHz timing signals including the T05T12 and SRBIT2, 3, 4, 6, 7 and 9 signals and signal DMAK10 to be described in connection with FIG. 9. In addition, the CPU 11 transitions the control lines 103 to a logic zero level to set the flip-flop 99 of FIG. 7 and reset the flip-flops 113, 117 and 118 of FIG. 8. CPU 11 transitions the control line 97 to reset the flip-flops 95 and 98 of FIG. 7.

The timing and control system signal on line 110 is at a logic zero level, and the signal on line 105 is at a logic one level. The output of negative OR gate 102 thus is at a logic one level. Since the flip-flop 95 is in a reset condition, the Q output of the flip-flop is at a logic one level, and the output of NOR gate 94 is at a logic zero level to enable the load input of the control unit 90. Upon the CPU 11 issuing a logic one signal to control line 90*a*, the command buffer (not shown) within the control unit 90 is selected. The CPU 11 thereupon loads the control unit with four command bytes from the ROM of the memory unit 12 via data bus 14. Such command bytes indicate the maximum number of data bytes per row of video information, the maximum number of visual attribute bytes per row, the maximum number of rows per display page, and other control information.

The CPU 11 thereafter transitions the control line 134 of FIG. 8 to a logic one level to load the register with address data on the data bus 14. The address data is the most significant eight bits of the memory address location of a first byte representative of a first character in a video information row to be displayed. The CPU 11 then controls the transfer of the least significant eight bits of the memory address location from the RAM of the memory unit 12 to the data bus 14. When the CPU 11 transitions the control line 134 to a logic zero level to enable counters 129, 130, 131 and 132 via NOR gate 127, the least significant bits are loaded from data bus 14 into counters 129 and 130, and the most significant bits are loaded from the register 133 into counters 131 and 132. The counters 129-132 at this time have the memory address of the first data byte of the first character of the video information row to be displayed on the CRT screen.

In operation, the CPU 11 issues a start command on control line 90*b* to the CRT control unit 90. The control unit thereafter issues a logic one direct memory access (DMA) request from the B0 output of the data bus buffer (not shown) of CRT control unit 90, through gate 92 to control line 93, which is a DMA request signal leading to the timing and control system 10 by way of control bus 16. The timing and control system 10 senses the DMA request from the CRT control system 13 and gates the information in counters 129-132 onto the address bus 15 during a DMA cycle assigned to the control system. In the preferred embodiment disclosed herein, the CRT control system 13 is assigned the DMA1 cycle as illustratd in FIG. 2 which occurs in approximately 4.0 microsecond intervals. The RAM of memory unit 12 thereby is addressed to provide the first byte of the first data character to be displayed to the data bus 14. The timing and control system 10 thereupon supplies a logic zero signal DMAK10- to line 110, which is normally at a logic one level, to acknowledge the DMA request. Upon the occurrence of a logic one clock signal on line 105 from the timing and control system 10, the output of NAND gate 94 transitions to a logic zero level to load the data byte on data bus 14 into the data buffer (not shown) of the control unit 90. If the control unit has not received the maximum number of data bytes for a video information row, the B0 output of the control unit remains at a logic one level which again is sensed by the timing and control system 10 via NOR gate 92 and control line 93 upon the next occurrence of a DMA1 cycle.

Data bytes and visual attribute bytes stored in the RAM of memory unit 12 are distinguished by their most significant bits (MSB). If the MSB is a logic zero, a data byte is indicated. A logic one indicates a visual attribute byte. When the control unit 90 has received the maximum number of data bytes in a vidwo information row, the B0 output of the control unit transitions to a logic zero level. The output of NOR gate 92 thereupon transitions to a logic zero to terminate the DMA requests. Since the flip-flops 95 and 98 are in a reset condition, the output of NOR gate 91 transitions to a logic zero level and the output of NAND gate 96 transitions to a logic one level. Upon the next occurrence of a logic one SRBIT3 pulse on line 100, the Q output of the flip-flop 99 and the output of AND gate 101 transitions to a logic one level. The Q output of flip-flop 99 transitions to a logic zero level to cause the output of negative AND gate 102 to transistion to a logic one level.

Upon the occurrence of a logic one SRBIT6 pulse on line 104, the Q output of flip-flop 95 transitions to a logic one level. The output of NOR gate 92 thus transitions to a logic one level to issue a DMA request to control line 93. In addition, the output of NOR gate 91 transitions to a logic one level while the output of NAND gate 96 transitions to a logic zero level.

Since the Q output of flip-flop 95 is at a logic zero level, the output of NAND gate 94 is at a logic one level to disable the load input to the control unit 90. When the timing and control system 10 applies a logic zero signal to the line 110 during DMA1 cycle, the output of negative AND gate 102 transitions to a logic one level. If the byte on the data bus is not a link, byte line 97 remains at a logic one level. In that event, the operation of flip-flops 95, 98 and 99 continues as before described to generate DMA requests until a link byte is detected as shall be further described below.

Upon the generation of two DMA requests after a link byte has been detected, control line 97 transitions to a logic zero level to reset flip-flops 95 and 98. The generation of DMA requests at the output of NOR gate 92 thereby is terminated.

Referring to FIG. 8, a byte is presented to the decoder 111 by way of data bus 14 each time the byte is presented to the CRT control unit 90. Further, the decoder 111 is enabled by the output of negative AND gate 102 of FIG. 7 on line 112 each time the timing and control system 10 issues a DMA ackowledge signal DMAK10- to line 110 of FIG. 7. Upon the occurrence of a logic one T05T12 pulse as an output of NAND gate 94 on line 112 during an enable period, the byte on data bus 14 is decoded by the decoder 111. If a link byte is detected, the B0 output of decoder 111 transitions to a logic one level. In the preferred embodiment as described herein, the decoder 111 is logically designed to detect a hexadecimal F1 code. Upon the occurrence of a logic one SRBIT9 pulse on line 114, the Q output of flip-flop 113 transistions to a logic one level to enable AND gate 116.

The logic of FIG. 7 continues to generate DMA requests as before described. A logic zero acknowledgement signal is applied by the timing and control system 10 to line 110 of FIG. 7 each time a DMA request is generated and a new byte is placed on the data bus 14. During a DMA cycle, the timing and control system 10 transitions the line 107 leading to NAND gate 106 to a logic one level. The output of NAND gate 106 thus transitions to a logic zero level to apply a logic one signal to line 109 via inverter 108. The flip-flop 117, which was reset during initialization, is triggered thereby. The logic one output of AND gate 116 thus is applied through the Q output of the flip-flop 117 to AND gate 121. The Q output of the flip-flop transitions to a logic zero to disable AND gate 116. The flip-flop 117 thus is placed in a set condition to indicate the occurrence of a first byte following the detection of the link byte. The first byte following the link byte is the most significant eight bits of a memory address location in memory unit 12 having stored therein a first data byte of a next video information row to be displayed on the CRT screen.

Upon the next occurrence of a logic one SRBIT9 pulse, the output of AND gate 121 transitions to a logic one level to cause the register 133 to be loaded with the most significant eight bits of the memory address location via NOR gate 125.

When the line 109 again transitions to a logic one level to indicate a second byte after the detection of the link byte, the flip-flop 117 is reset. The flip-flop 118, which was reset during the initialization cycle, is set to provide a logic one level at the Q output.

Upon the occurrence of logic one pulses concurrently on lines 114 and 126, the output of AND gate 122 transitions to a logic one level to cause the counters 129 and 130 to be loaded with the least significant eight bits of a memory address. In addition, the counters 131 and 132 are loaded from register 133 with the most significant eight bits of the memory address.

Upon the occurrence of a logic one SRBIT4 pulse on line 124 concurrently with a logic one SRBIT3- pulse on line 123, the output of NAND gate 120 transitions to a logic zero level. The output of negative OR gate 115 thus transitions to a logic zero level to reset flip-flops 113, 117 and 118 of FIG. 8, and to reset flip-flops 95 and 98 by way of line 97. In addition, flip-flop 99 is set.

During the time periods that DMA requests are being generated, the output of NAND gate 119 transitions to a logic one level each time the line 109 transitions to a logic and level concurrently with the SRBIT2 and SRBIT4 signals on lines 128 and 124, respectively. In response thereto, the counters 129–132 are incremented to address a next byte representative of the next character in the video information row of memory unit 12 to be displayed on the CRT screen.

FIG. 9

Figure 9:
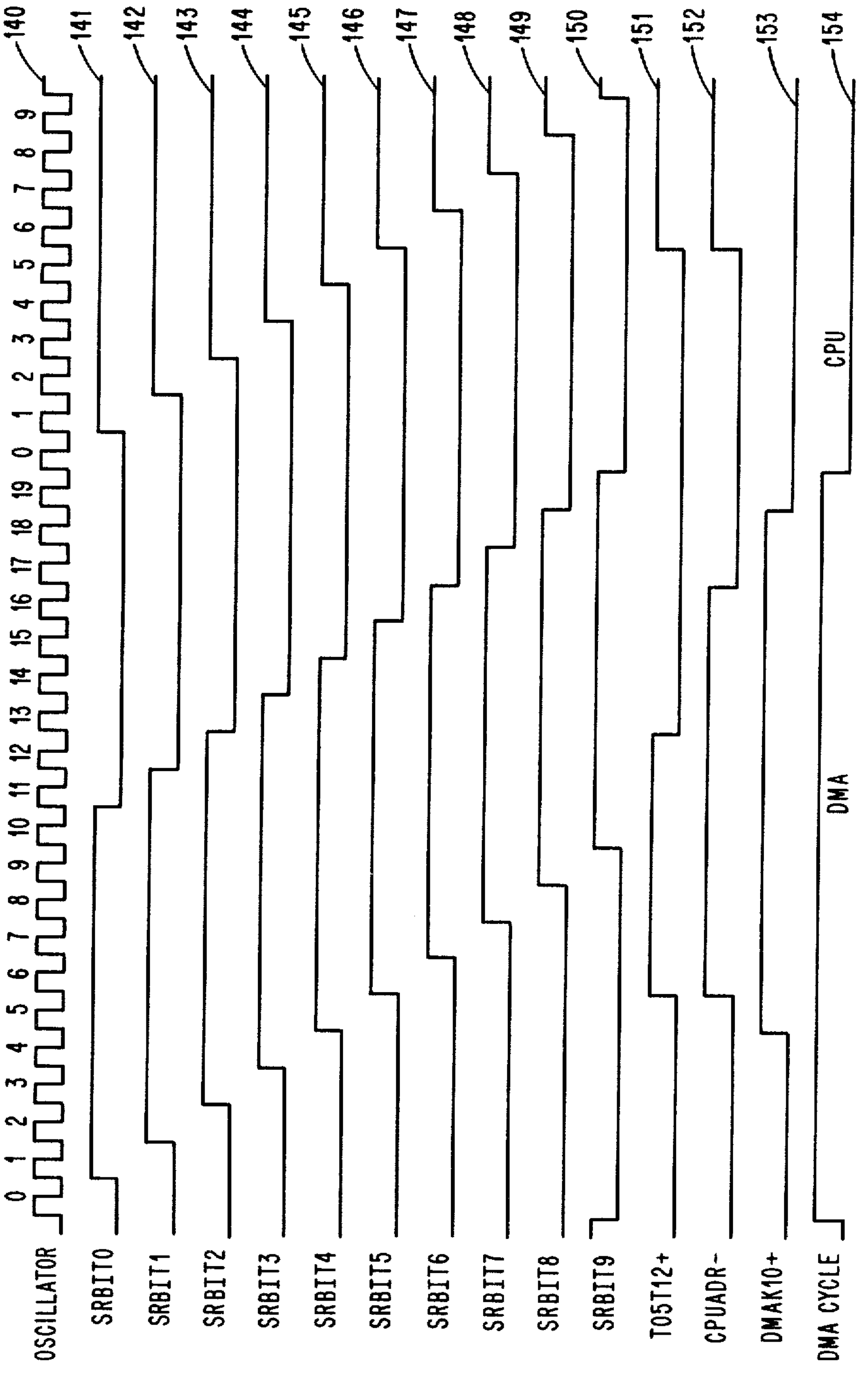
FIG. 9 is a timing diagram of timing control signals employed in the operation of the logic control system of FIGS. 7 and 8.

FIG. 9 illustrates in timing diagram form the timing signals generated by the timing and control system 10 and used in the operation of the logic control system of FIGS. 7 and 8.

Waveform 140 illustrates the output of a 20.3 MHz basic oscillator, the output of which is applied to a ten-bit shift register (not shown) within the timing and control system 10 of FIG. 1 to provide timing signals SRBIT0 through SRBIT9 of a 1.0 MHz frequency as illustrated by waveforms 141–150, respectively. The SRBIT0-9 signals in turn are used by the timing and control system 10 to generate the T05T12, CPUADR- and DMAK10 timing and control signals as illustrated by waveforms 151–153, respectively.

The SRBIT0-9 signals are delayed in order by 49.23 nanoseconds. The generation of timing signals of various lengths from 49.23 nanoseconds in width to 986.4 nanoseconds in width thus may be accommodated. In addition, the SRBIT0-9 signals provide for the synchronization of the CPU 11, memory unit 12 and the CRT control system 13, and provide the timing for controlling the generation of duty cycles on the data bus 14, address bus 15 and control bus 16.

The CPUADR signal of waveform 152 indicates to the logic control system of FIGS. 7–8 that the system address bus 15 available, and that either the CPU or a DMA device is active. For example, when the signal is at a logic zero level, the CPU 11 has access to the system data bus. When the signal is at a logic one level, however, a DMA device has access to the system data bus. In addition, the sixteen address bits stored in counters 129–132 of FIG. 8 are gated onto the system address bus 15 during the DMA cycle.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A hardware-firmware logic control system in a data processing system for accommodating the transfer of rows of display information of variable length stored in random order in a system memory unit to a CRT control system wherein said data processing system includes a timing control system for generating a plurality of timing signals, said memory including a random access memory (RAM) for storing each of said rows of display information and a read only memory (ROM) for storing command bytes indicative of the maximum number of characters in said each of said rows of display information, and a central processing unit (CPU), all coupled in common to a system bus, said CRT control system comprising:

(a) CRT control means coupled to said CPU and said ROM and responsive to a write command signal from said CPU for storing said command bytes received from said ROM and responsive to a start signal from said CPU for generating a direct memory access (DMA) request signal to said timing control system;

(b) DMA request logic means coupled to said CRT control means and said timing control means and responsive to the DMA request signal and a DMA cycle signal for generating a DMA acknowledge signal;

said CRT control means coupled to said RAM and responsive to the DMA acknowledge signal for receiving a plurality of data byte signals and attribute byte signals followed by link byte signals and a plurality of address byte signals indicative of said each of said rows of display information;

(c) link character decode means coupled to said RAM and said timing control system and responsive to the DMA acknowledge signal and the link byte signals for generating a link signal and a load signal;

(d) most significant byte address logic means coupled to said RAM and said link character decode means and responsive to the link signal for storing most significant byte signals representative of the most significant byte of the plurality of address byte signals; and (e) memory address logic means coupled to said RAM and said most significant byte address logic means and responsive to the load signal for storing the most significant byte signals received from said most significant byte address logic means and least significant byte signals received from said RAM for transfer to said RAM the most significant byte signals and the least significant byte signals being indicative of an address location storing a byte representative of a first character of a next row of display information.

2. A hardware-firmware control system includes a timing control system, a central processing unit (CPU), a memory unit and a CRT control system, all coupled in common to a system bus for accommodating the addition, deletion or reordering of rows of display information forming display pages, said rows of display information being stored in said memory unit for transfer to said CRT control system, said CRT control system comprising:

(a) CRT control system means coupled to said CPU and said memory unit and responsive to a first CPU signal for storing a plurality of command bytes indicative of the length of each of said rows of display information received from said memory unit for generating a direct memory access (DMA) request signal for transfer to said timing control system and to DMA request logic means;

(b) said DMA request logic means coupled to said CRT control system means and said timing control system and responsive to said DMA request signal and a DMA cycle signal from said timing control system for generating an enable signal;

(c) link character decode means coupled to said memory unit and said DMA request logic means and responsive to said enable signal for receiving a plurality of byte signals representative of each of said rows of display information and generating a link signal when one of said plurality of byte signals representative of a link byte is received by said link character decode means; and (d) memory address counter means coupled to said memory unit and said link character decode means and responsive to said link signal for storing address byte signals contiguous to and following said link byte of said plurality of byte signals, said address byte signals being indicative of a first character byte of a next of said rows of display information stored in said memory unit, thereby accommodating the reordering of display rows stored in said memory unit to form said display page without reconstructing character bytes stored in said memory unit.

3. A method of deleting one of variable length rows of information displayed on a cathode ray tube (CRT) of a video display system, said method comprising:

(a) randomly storing said rows of information in a random access memory, each of said rows of information being represented by character bytes for display on said CRT followed by a linking byte and a plurality of address bytes, each of said bytes being stored in successive address locations of said memory;

(b) addressing a first and successive chracter bytes of one of said rows of information stored in said memory for displaying a first information line on said CRT and addressing said linking byte and said plurality of address bytes following said character bytes;

(c) detecting said linking byte and receiving said plurality of address bytes;

(d) storing said plurality of address bytes in a counter for reading an address location in said memory storing a first and successive character bytes for displaying a second information line on said CRT and addressing said linking byte and said plurality of address bytes following said character bytes;

(e) repeating steps (c) and (d) until a first display page is displayed on said CRT;

(f) moving a cursor on said CRT to the first character of a selected information line through said keyboard;

(g) depressing a delete row key on said keyboard;

(h) modifying said address bytes of said information row representative of an information line immediately preceding said selected information line to point to said first character byte of an information line immediately following said selected information line; and (i) modifying said address bytes of a last line of said first display page to point to said first character byte of a new line for display of a last line of a second display page, said last line of said first display page being a next to last line of said second display page, said address bytes of said last line of said second display page pointing to said address location of said character byte of said first information line of said first display page for display as said first information line of said second display page.

4. A method of inserting a row of information into variable length rows of information displayed on a cathode ray tube (CRT), each of said rows of information being stored in a memory at successive address locations being represented by character bytes followed by a linking byte identifying the bytes following said linking byte as address bytes identifying the address location of a first character byte of a next row of information displayed on said CRT, said method comprising:

(a) moving a cursor to the first character of a selected information line of a first display page of said CRT by means of move cursor keys on a keyboard;

(b) depressing an insert row key on said keyboard;

(c) modifying said address bytes of an information line immediately above said selected information line to point to an address location on said memory of a first character byte of an inserted information line of a second display page of said CRT;

(d) modifying said address bytes of a next to last information line of said first display page to point to an address location in said memory of said first character byte of a first information line of said first display page, said first and next to last information lines of said first display page becoming said first and a last information lines of said second display page; and (e) generating said address bytes of said inserted information line to point to said address location of said first character byte of said information line following said inserted information line.

* * * * *